US011023526B2

(12) United States Patent
Abou Mahmoud et al.

(10) Patent No.: US 11,023,526 B2
(45) Date of Patent: Jun. 1, 2021

(54) SYSTEM AND METHOD FOR GRAPH SEARCH ENHANCEMENT

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/612,172

(22) Filed: Jun. 2, 2017

(65) Prior Publication Data

US 2018/0349509 A1    Dec. 6, 2018

(51) Int. Cl.
| | |
|---|---|
| *G06F 16/00* | (2019.01) |
| *G06F 16/901* | (2019.01) |
| *G06K 9/46* | (2006.01) |
| *G06F 16/51* | (2019.01) |
| *G06F 16/58* | (2019.01) |
| *G06K 9/00* | (2006.01) |
| *G06F 16/30* | (2019.01) |

(52) U.S. Cl.
CPC .......... *G06F 16/9024* (2019.01); *G06F 16/51* (2019.01); *G06F 16/5866* (2019.01); *G06K 9/00476* (2013.01); *G06K 9/469* (2013.01); *G06K 2209/01* (2013.01)

(58) Field of Classification Search
CPC ............... G06K 9/00476; G06K 9/469; G06K 2209/01; G06F 16/51; G06F 16/5866; G06F 16/9024; G06F 16/285; G06F 16/583; G06F 16/242; G06F 16/248

See application file for complete search history.

(56) References Cited

U.S. PATENT DOCUMENTS

| | | | |
|---|---|---|---|
| 5,751,852 A * | 5/1998 | Marimont | G06K 9/4638 382/180 |
| 8,396,884 B2 | 3/2013 | Singh et al. | |
| 8,452,108 B2 * | 5/2013 | Walch | G06K 9/00872 382/203 |
| 9,158,847 B1 | 10/2015 | Majumdar | |
| 9,202,130 B2 | 12/2015 | Baba et al. | |
| 9,448,995 B2 | 9/2016 | Kurz | |
| 9,959,647 B1 * | 5/2018 | Brost | G06K 9/0063 |
| 10,007,863 B1 * | 6/2018 | Pereira | G06K 9/6267 |

(Continued)

OTHER PUBLICATIONS

Hamdy Zidan, Gerik Scheuermann "Graph Reconstruction From Drawings With Crossings", Feb. 12-14, 2013, Proceedings of the IASTED International Conference Computer Graphics and Imaging (CGIM 2013) (Year: 2013).*

(Continued)

*Primary Examiner* — Polina G Peach
(74) *Attorney, Agent, or Firm* — Konrad Raynes Davda & Victor LLP; Rabindranath Dutta

(57) ABSTRACT

A method, computer program product, and computer system for analyzing an image to detect a plurality of geometric shapes in the image. The method may also include building a graph data structure resembling the image based upon, at least in part, analyzing the image. In some embodiments, building the graph data structure may include traversing the image to generate one or more graph data structure clauses.

9 Claims, 8 Drawing Sheets

(56) References Cited

U.S. PATENT DOCUMENTS

| | | | | |
|---|---|---|---|---|
| 2004/0008884 | A1* | 1/2004 | Simske | H04N 1/4095 |
| | | | | 382/165 |
| 2008/0033897 | A1* | 2/2008 | Lloyd | G06F 9/4488 |
| | | | | 706/19 |
| 2008/0052638 | A1* | 2/2008 | Frank | G06K 9/00476 |
| | | | | 715/808 |
| 2008/0068379 | A1* | 3/2008 | Larsen | G06T 7/74 |
| | | | | 345/427 |
| 2008/0247674 | A1* | 10/2008 | Walch | G06K 9/344 |
| | | | | 382/305 |
| 2009/0138810 | A1* | 5/2009 | Howard | G06F 3/0481 |
| | | | | 715/760 |
| 2009/0252046 | A1* | 10/2009 | Canright | H04L 41/12 |
| | | | | 370/250 |
| 2009/0292685 | A1* | 11/2009 | Liu | G06F 16/73 |
| 2010/0046842 | A1* | 2/2010 | Conwell | G06K 9/228 |
| | | | | 382/218 |
| 2010/0169301 | A1* | 7/2010 | Rubanovich | G06F 16/951 |
| | | | | 707/709 |
| 2010/0185643 | A1* | 7/2010 | Rao | G06F 16/242 |
| | | | | 707/759 |
| 2010/0189316 | A1* | 7/2010 | Walch | G06K 9/0008 |
| | | | | 382/125 |
| 2010/0332475 | A1* | 12/2010 | Birdwell | G06K 9/6224 |
| | | | | 707/737 |
| 2011/0137895 | A1* | 6/2011 | Petrou | H04W 4/02 |
| | | | | 707/723 |
| 2011/0246635 | A1* | 10/2011 | Phukan | G06Q 10/06 |
| | | | | 709/223 |
| 2012/0323889 | A1 | 12/2012 | Marum et al. | |
| 2013/0046823 | A1* | 2/2013 | Mitchell | G06Q 10/107 |
| | | | | 709/204 |
| 2013/0156348 | A1* | 6/2013 | Irani | G06F 16/5854 |
| | | | | 382/305 |
| 2013/0268916 | A1* | 10/2013 | Misra | G06F 8/74 |
| | | | | 717/123 |
| 2016/0057733 | A1* | 2/2016 | Grandillo | H04H 20/423 |
| | | | | 370/252 |
| 2016/0217153 | A1* | 7/2016 | Hendrey | G06T 11/20 |
| 2016/0217607 | A1* | 7/2016 | Hendrey | G06T 15/30 |
| 2016/0335371 | A1 | 11/2016 | Rao | |
| 2017/0177195 | A1* | 6/2017 | Findlay | G06K 9/22 |
| 2018/0060701 | A1* | 3/2018 | Krishnamurthy | G06K 9/6255 |
| 2018/0101724 | A1* | 4/2018 | Fingado | G06T 11/206 |

OTHER PUBLICATIONS

Author Unknown, "How Search Engines Rank Web Pages / Search Engine Watch," https://searchenginewatch.com/sew/news/2064539/how-search-engines-rank-web-pages, downlownloaded Dec. 9, 2016, pp. 1-18.

Wikipedia, "Optical Character Recognition," https://en.wikipedia.org/wiki/Optical_character_recognition, downloaded Dec. 9, 2016, pp. 1-10.

Minichino, "Detecting Edges, Lines, and Shapes," https://www.packtpub.com/books/content/detecting-edges-lines-and-shapes, downloaded Mar. 15, 2017, dated Sep. 2015, pp. 1-13.

Author Unknown, "OpenCV Tutorial C++," http://opencv-srf.blogspot.com/2011/09/object-detection-tracking-using-contours.html, downloaded Mar. 15, 2017, pp-1-20.

McGee, "Zanran: New Search Engine That Unearths Data in Charts, Graphs & Tables," May 12, 2011, http://searchengineland.com/zanran-new-search-engine-that-unearths-data-in-charts-graphs . . . downloaded Dec. 9, 2016, pp. 1-6.

Cretu et al., "Building Detection in Aerial Images Based on Watershed and Visual Attention Feature Descriptors," 2013 International Conference on Computer and Robot Vision, IEEE 2013, pp. 265-272.

Author Unknown, "Connecting Edges Detected by an Edge Detector," https://dsp.stackexchange.com/questions/2523/connecting-edges-detected-by-an-edge-detec . . . downloaded Mar. 14, 2017, pp- 1-3.

Dimberger et al., "NEFI: Network extraction From Images," https://www.ncbi.nlm.nih./gov/pmc/articles/PCM4629128/ downloaded Mar. 15, 2017, Sci Rep. 2015; 5: 156669, Published online Nov. 2, 2015. doi: 10.1038/srep15669, pp. 1-11.

Author Unknown, "Cloud Vision API, Derive Insight from Images with our Powerful Cloud Vision API," https://cloud.google.com/vision/ downloaded Mar. 15, 2017, Vision API—Image Content Analysis/Google Cloud Platform, pp. 1-7.

Author Unknown, "Michigan Image Reconstruction Toolbox (MIRT)," https://web.eecs.umich.edu/-fessler/code/ downloaded Mar. 15, 2017, pp. 1-2.

Gorman et al., "Document Image Analysis," IEEE Computer Society Executive Briefings, ISBN 0-8186-7802-X, Library of Congress No. 97-17283, 1997, out of print 2009, pp. 1-127.

Author Unknown, "Image Analysis, Image Processing Techniques for Image Analysis," https://ww.mathworks.com/discovery/image-analysis.html?requestedDomain=www.mat . . . downloaded Mar. 15, 2017, Image Analysuis—MATLAB & Simulink, pp. 1-4.

Author Unknown, "Analyzing the Panama Papers with Neo4J: Data Models, Queries & More," https://neo4j.com/blog/analyzing-panama-papers-neo4j/, downloaded Mar. 15, 2017, pp. 1-20.

Wijewardana, "E-R Diagram for Hospital Managment System," https://creately.com/diagram/example/h7ithflsl/E-R+diagram+for+hospital+management+ . . . , downloaded Mar. 15, 2017, pp. 1-3.

Washio et al., "Advances in Mining Graphs, Trees and Sequences," Frontiers in Artificial Intelligence and Applications, excerpt from—Graph-Based Representations in Pattern Recognition, https://books.google.com/books?id=vc4GCAAAQBAJ&pg=PA274#v=onepage&q&f=false.

Erus et al., "Automatic Learning of Structural Models of Cartographic Objects," 5th IAPR International Workshop, GbRPR 2005 Poitiers, France, Apr. 11-13, 2005 proceedings, pp. cover, table of contents, 273-280.

Houbraken et al, "The Index-Based Subgraph Matching Algorithm with General Symmetries (ISMAGS): Exploiting Symmetry for Faster Subgraph Enumeration," PLOS ONE / www.plosone.org, May 2014/vol. 9/Issue5/e97896, Department of Information Technology, Ghent University, pp. 1-15.

Giugno et al., "GraphGrep: A Fast and Universal Method for Querying Graphs," IEEE 2002, 1051-4651/02, pp. 112-115.

Wikipedia, "Image Analysis," https://en.wikipedia.org/wiki/Image_analysis, downloaded Mar. 15, 2017, pp. 1-4.

Houbraken et al, "The Index-Based Subgraph Matching Algorithm with General Symmetries (ISMAGS): Exploiting Symmetry for Faster Subgraph Enumeration," PLOS ONE / www.plosone.org, May 2014/vol. 9/Issue5/e97896, Department of Information Technology, Ghent University, Abstract Attached, pp. 1-16.

Minichino et al., "Learning OpenCV 3 Computer Vision with Python: Unleash the Power of Computer Vision with Python Using OpenCV," https://www.packtpub.com/books/content/detecting-edges-lines-and-shapes, downloaded Mar. 15, 2017, dated Sep. 2015, pp. 49-55.

Erus, G., et al., "Automatic Learning of Structural Models Cartographic Objects", In Proceedings of the 5th IAPR International Conference on Graph-Based Representations in Pattern Recognition, Apr. 11-13, 2005, 8 pp.

* cited by examiner

SYSTEM AND METHOD FOR GRAPH SEARCH ENHANCEMENT

TECHNICAL FIELD

The present disclosure generally relates to a system and method for enhancing searches, and more particularly relates to searching graphs.

BACKGROUND

Graphs are among the most popular ways to visually depict relationships, flows, layout, transformations, time, history, etc. The Internet is full of graphs being used to graphically convey information to readers. Unfortunately, searching for graphs is often difficult. Current search engines may search for images but these mostly depend on the captions or text around the image. As such, these methods do not yield accurate results. Therefore, it may be of interest to more accurately search for graphs from images.

BRIEF SUMMARY OF DISCLOSURE

In one example implementation, a method, performed by at least one processor, may include analyzing, on the at least one processor, an image to detect a plurality of geometric shapes in the image. The method may also include building a graph data structure resembling the image based upon, at least in part, analyzing the image. In some embodiments, building the graph data structure may include traversing the image to generate one or more graph data structure clauses.

One or more of the following example features may be included. In some embodiments, analyzing the image may include identifying one or more closed shapes and one or more connector shapes from the plurality of geometric shapes and identifying one or more intersections between the one or more closed shapes and the one or more connector shapes. In some embodiments, building the graph data structure may include defining each of the one or more closed shapes intersecting with the one or more connector shapes as an entity within the one or more graph data structure clauses and defining each of the one or more connector shapes intersecting with the one or more closed shapes as a relationship within the one or more graph data structure clauses. In some embodiments, building the graph data structure may also include performing optical character recognition (OCR) on an area within each of the one or more closed shapes to identify text to add as a label for each entity and performing OCR on an area surrounding each of the one or more connector shapes to identify text to add as a label for each relationship.

In some embodiments, traversing the image to generate the one or more graph data structure clauses may include traversing beginning from one or more of a user-selected entity and an entity selected based upon, at least in part, one or more criteria. The method may further include receiving a user query and dividing the user query into at least one smaller query at each conjunction within the user query. The method may also include transforming the at least one smaller query into at least one graph data structure query including transforming each noun of each at least one smaller query into an entity and each verb of each at least one smaller query into a relationship. The method may further include conducting a search against one or more graph data structures based upon, at least in part, the at least one smaller query and returning at least one image associated with the graph data structure that satisfies at least a portion of the at least one smaller query.

In another example implementation, a computer program product including a non-transitory computer readable storage medium may have a plurality of instructions stored thereon, which, when executed by a processor, may cause the processor to perform operations that may include analyzing an image to detect a plurality of geometric shapes in the image. Instructions may also be included for building a graph data structure resembling the image based upon, at least in part, analyzing the image. In some embodiments, building the graph data structure may include traversing the image to generate one or more graph data structure clauses.

One or more of the following example features may be included. In some embodiments, analyzing the image may include identifying one or more closed shapes and one or more connector shapes from the plurality of geometric shapes and identifying one or more intersections between the one or more closed shapes and the one or more connector shapes. In some embodiments, building the graph data structure may include defining each of the one or more closed shapes intersecting with the one or more connector shapes as an entity within the one or more graph data structure clauses and defining each of the one or more connector shapes intersecting with the one or more closed shapes as a relationship within the one or more graph data structure clauses. In some embodiments, building the graph data structure may also include performing optical character recognition (OCR) on an area within each of the one or more closed shapes to identify text to add as a label for each entity and performing OCR on an area surrounding each of the one or more connector shapes to identify text to add as a label for each relationship.

In some embodiments, traversing the image to generate the one or more graph data structure clauses may include traversing beginning from one or more of a user-selected entity and an entity selected based upon, at least in part, one or more criteria. Instructions may further be included for receiving a user query and dividing the user query into at least one smaller query at each conjunction within the user query. Instructions may also be included for transforming the at least one smaller query into at least one graph data structure query including transforming each noun of each at least one smaller query into an entity and each verb of each at least one smaller query into a relationship. Instructions may further be included for conducting a search against one or more graph data structures based upon, at least in part, the at least one smaller query and returning at least one image associated with the graph data structure that satisfies at least a portion of the at least one smaller query.

In another example implementation, a computing system comprising a processor and a memory module coupled with the processor may be provided, the processor may be configured for analyzing an image to detect a plurality of geometric shapes in the image. The processor may also be configured for building a graph data structure resembling the image based upon, at least in part, analyzing the image. In some embodiments, building the graph data structure may include traversing the image to generate one or more graph data structure clauses.

One or more of the following example features may be included. In some embodiments, analyzing the image may include identifying one or more closed shapes and one or more connector shapes from the plurality of geometric shapes and identifying one or more intersections between the one or more closed shapes and the one or more connector shapes. In some embodiments, building the graph data structure may include defining each of the one or more closed shapes intersecting with the one or more connector shapes as an entity within the one or more graph data structure clauses and defining each of the one or more connector shapes intersecting with the one or more closed shapes as a relationship within the one or more graph data structure clauses. In some embodiments, building the graph data structure may also include performing optical character recognition (OCR) on an area within each of the one or more closed shapes to identify text to add as a label for each entity and performing OCR on an area surrounding each of the one or more connector shapes to identify text to add as a label for each relationship.

In some embodiments, traversing the image to generate the one or more graph data structure clauses may include traversing beginning from one or more of a user-selected entity and an entity selected based upon, at least in part, one or more criteria. The processor may be further configured for receiving a user query and dividing the user query into at least one smaller query at each conjunction within the user query. The processor may also be configured for transforming the at least one smaller query into at least one graph data structure query including transforming each noun of each at least one smaller query into an entity and each verb of each at least one smaller query into a relationship. The processor may be further configured for conducting a search against one or more graph data structures based upon, at least in part, the at least one smaller query and returning at least one image associated with the graph data structure that satisfies at least a portion of the at least one smaller query.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
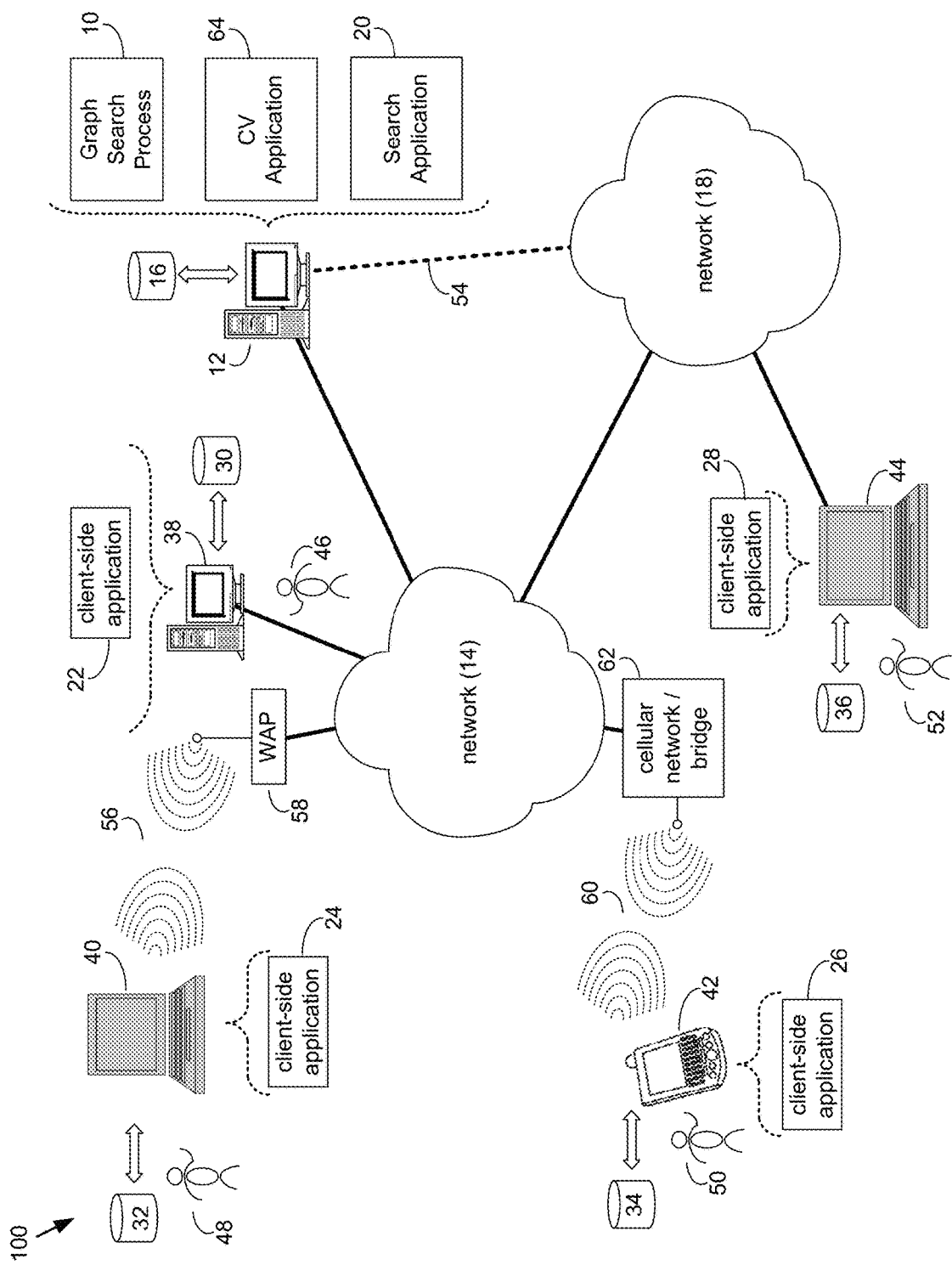
FIG. 1 is an example diagrammatic view of graph search process coupled to a distributed computing network according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown graph search process 10 that may reside on and may be executed by a personal computer (e.g., computing device 12), which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s).

Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, graph search process 10 may analyze 316 an image to detect a plurality of geometric shapes in the image. Graph search process 10 may also build 318 a graph data structure resembling the image based upon, at least in part, analyzing the image.

The instruction sets and subroutines of graph search process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Graph search process 10 may be a stand-alone application that interfaces with an applet/application that is accessed via client applications 22, 24, 26, 28. In some embodiments, graph search process 10 may be, in whole or in part, distributed in a cloud computing topology. In this way, computing device 12 and storage device 16 may refer to multiple devices, which may also be distributed throughout network 14 and/or network 18.

Computing device 12 may execute a search application (e.g., search application 20), examples of which may include, but are not limited to, applications that generate and/or receive queries to search for content from one or more databases, servers, cloud storage servers, etc. Graph search process 10 and/or search application 20 may be accessed via client applications 22, 24, 26, 28. Graph search process 10 may be a stand-alone application, or may be an applet/application/script/extension that may interact with and/or be executed within search application 20, a component of search application 20, and/or one or more of client applications 22, 24, 26, 28. Search application 20 may be a stand-alone application, or may be an applet/application/ script/extension that may interact with and/or be executed within graph search process 10, a component of graph search process 10, and/or one or more of client applications 22, 24, 26, 28. One or more of client applications 22, 24, 26, 28 may be a stand-alone application, or may be an applet/application/script/extension that may interact with and/or be executed within and/or be a component of graph search process 10 and/or search application 20. Examples of client applications 22, 24, 26, 28 may include, but are not limited to, applications that receive queries to search for content from one or more databases, servers, cloud storage servers, etc., a textual and/or a graphical user interface, a customized web browser, a plugin, an Application Programming Interface (API), or a custom application. Additionally and/or alternatively, client applications 22, 24, 26, 28 may include computer vision (CV) applications (e.g., CV application 64). The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more client applications 22, 24, 26, 28 may be configured to effectuate some or all of the functionality of graph search process 10 (and vice versa). Accordingly, graph search process 10 may be a purely server-side application, a purely client-side application, or a hybrid server-side/client-side application that is cooperatively executed by one or more of client applications 22, 24, 26, 28 and/or graph search process 10.

One or more of client applications 22, 24, 26, 28 may be configured to effectuate some or all of the functionality of search application 20 (and vice versa). Accordingly, search application 20 may be a purely server-side application, a purely client-side application, or a hybrid server-side/client-side application that is cooperatively executed by one or more of client applications 22, 24, 26, 28 and/or search application 20. As one or more of client applications 22, 24, 26, 28, graph search process 10, and search application 20, taken singly or in any combination, may effectuate some or all of the same functionality, any description of effectuating such functionality via one or more of client applications 22, 24, 26, 28, graph search process 10, search application 20, or combination thereof, and any described interaction(s) between one or more of client applications 22, 24, 26, 28, graph search process 10, search application 20, or combination thereof to effectuate such functionality, should be taken as an example only and not to limit the scope of the disclosure.

Users 46, 48, 50, 52 may access computing device 12 and graph search process 10 (e.g., using one or more of client electronic devices 38, 40, 42, 44) directly through network 14 or through secondary network 18. Further, computing device 12 may be connected to network 14 through secondary network 18, as illustrated with phantom link line 54. Graph search process 10 may include one or more user interfaces, such as browsers and textual or graphical user interfaces, through which users 46, 48, 50, 52 may access graph search process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
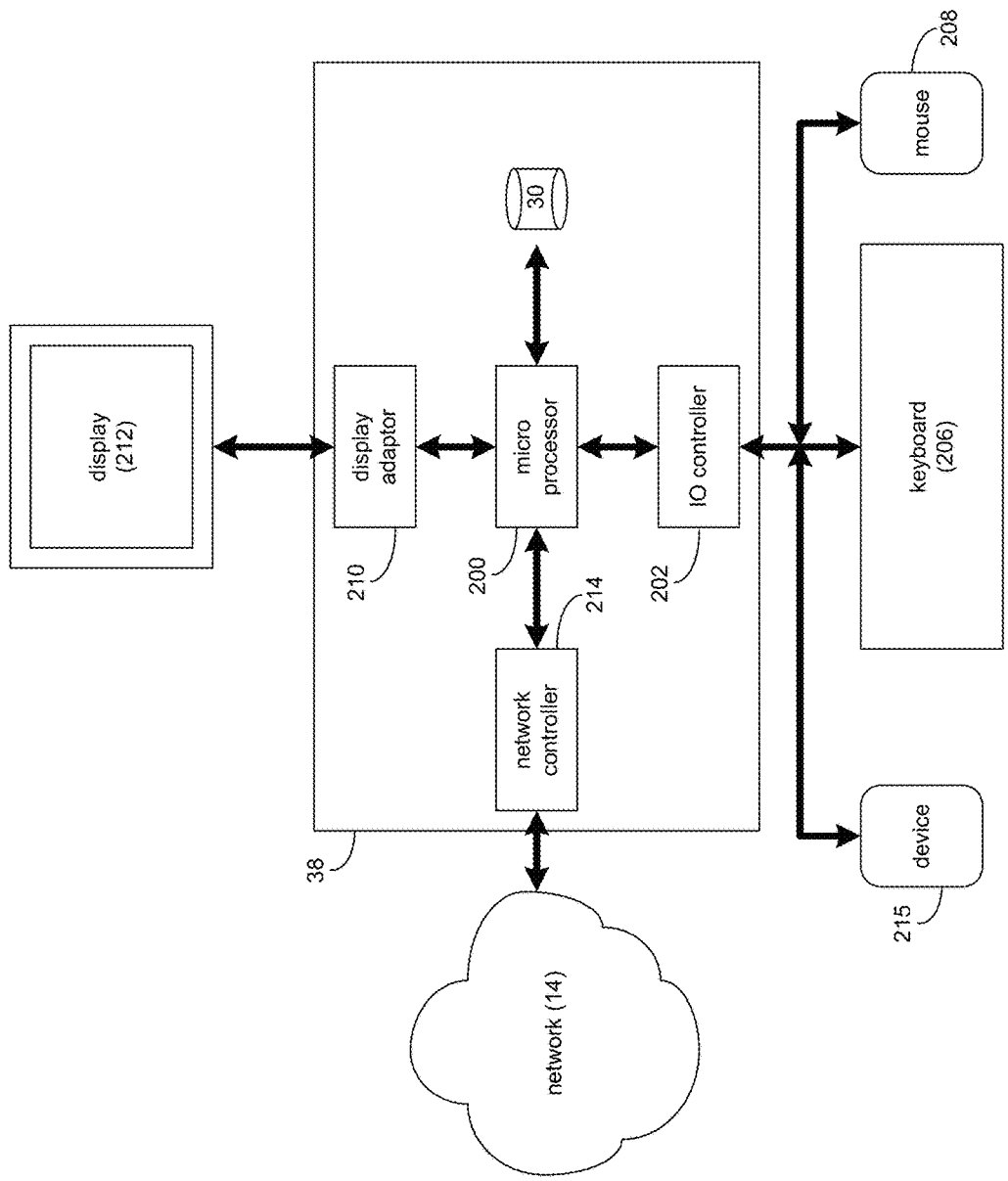
FIG. 2 is an example diagrammatic view of a client electronic device of FIG. 1 according to one or more example implementations of the disclosure.
Figure 3:
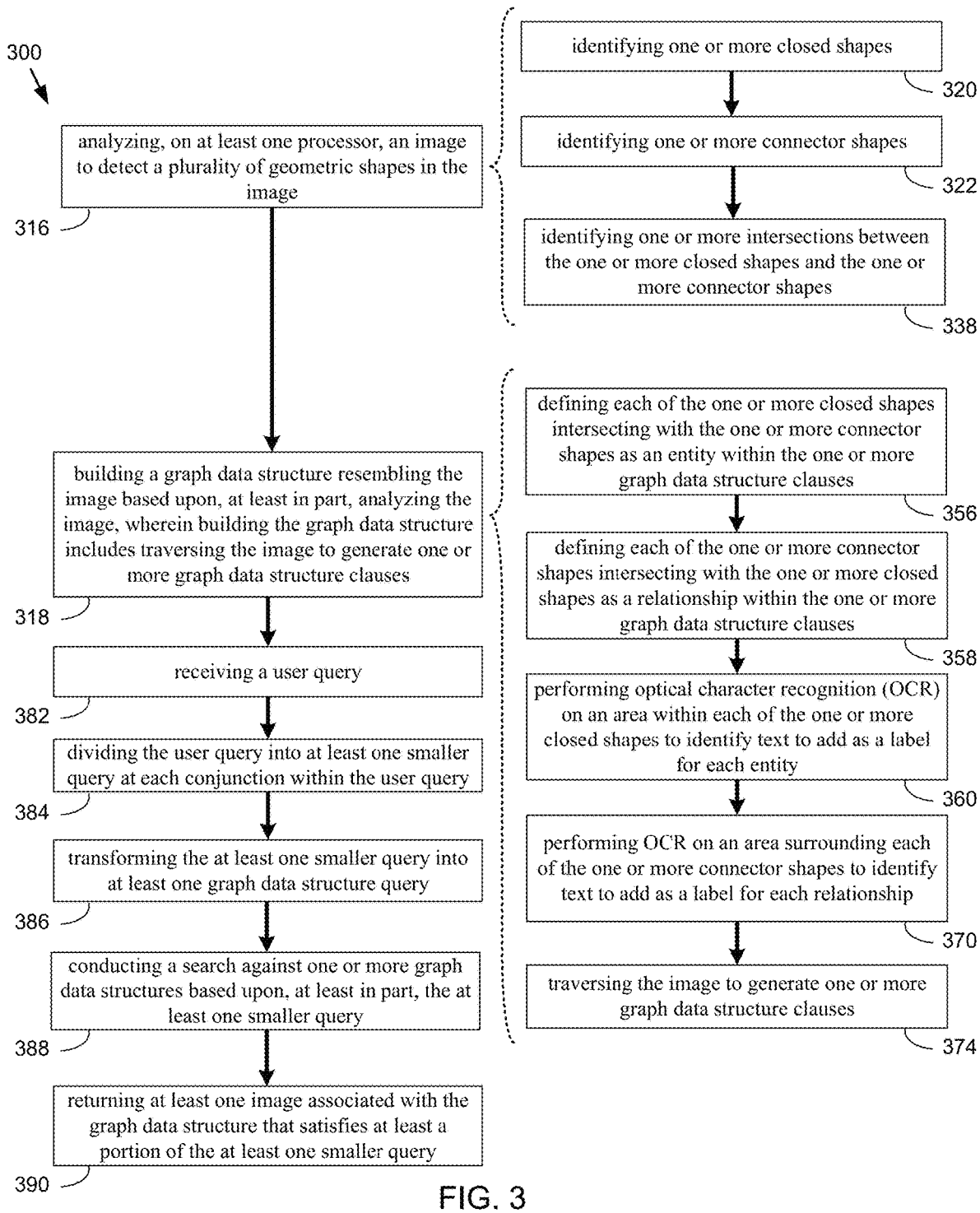
FIG. 3 is an example flowchart of the graph search process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, graph search process 10 may be substituted for client electronic device 38 within FIG. 2, examples of which may include but are not limited to computing device 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also at least to FIGS. 3-8, graph search process 10 may analyze 316 an image to detect a plurality of geometric shapes in the image. Graph search process 10 may build 318 a graph data structure resembling the image based upon, at least in part, analyzing the image.

As generally discussed above with reference to FIG. 3, graph search process 10 may analyze 316 an image to detect a plurality of geometric shapes in the image. In some embodiments, an image may include a photograph or a diagram. In some embodiments, the image may be a digital representation displayed on a user interface and/or may be a physical photograph or diagram or a reproduction of a photograph or diagram. As will be discussed in greater detail below, an image may include a plurality of geometric shapes. In some embodiments, the image may include a pictorial representation of relationships between the plurality of geometric shapes. Examples may include hierarchical diagrams, flowcharts, cycles, etc.

In some embodiments, analyzing an image to detect a plurality of geometric shapes may utilize computer vision. Computer vision, as used herein, may include but is not limited to, methods, processes, and/or algorithms for acquiring, processing, and interpreting images by a computing device. Computer vision may be in the form of a computer vision (CV) application or process used in conjunction with graph search process 10. As such and in some embodiments, graph search process 10 may include artificial intelligence systems, CV applications and/or CV algorithms for analyzing an image to detect a plurality of geometric shapes in the image. For example, an image may be received by graph search process 10 in the form of an input from a CV application (e.g., CV application 64). An example CV application that may be used within graph search process 10 may be OpenCV (Open Source Computer Vision). In some embodiments, CV application 64 may receive an image from a camera, image files, video files, and/or raw bytes.

Graph search process 10 may analyze the image to detect a plurality of geometric shapes. For example, graph search process 10, either directly or through a CV application (e.g., CV application 64), may detect edges. In some embodiments, graph search process 10 may apply one or more edge-finding filters, such as Laplacian, Sobel, or Scharr filters configured to turn non-edge regions to black while turning edge regions to white and/or saturated colors. Additionally and/or alternatively, graph search process 10 may blur an image with one or more blurring filters to prevent the misidentification of noise as an edge. In some embodiments, a Canny edge detector may be used to detect edges in the image associated with the plurality of geometric shapes. Additional details regarding suitable edge detection are described, for example, in Minichino, J., & Howse, J. (2015). *Learning OpenCV 3 computer vision with Python: unleash the power of computer vision with Python using OpenCV.* (pp. 49-55). Birmingham, UK: Packt Publishing, which is incorporated herein by reference.

In some embodiments, graph search process 10 may perform contour detection on the image to detect the plurality of geometric shapes. Contour detection, as used herein, may include but is not limited to, computing bounded polygons approximating a shape of interest and may be based upon, at least in part, the input image, a hierarchy type, and/or a contour approximation method. In some embodiments, contour detection through graph search process 10 may return a modified image, contours on the modified image, and the hierarchy of the contours on the modified image. Graph search process 10 may detect one or more contours in the image. For each detected contour, graph search process 10 may obtain a sequence of points of the contour or vertices of the contour. In some embodiments, a number of vertices for the contour may be used to detect the plurality of geometric shapes in the image. For example, a contour detected in the image with three vertices may be identified as a triangle. In another example, a contour detected with four vertices may be identified as a quadrangle. In yet another example, a contour detected with a large number of vertices and/or with limited distance between each vertex may be identified as a circle. While these example shapes and numbers of vertices have been described, other shapes and other numbers of vertices are within the scope of the present disclosure. Suitable example techniques for contour detection are also described in Minichino, J., & Howse, J. (2015). *Learning OpenCV 3 computer vision with Python: unleash the power of computer vision with Python using OpenCV.* (pp. 56-65). Birmingham, UK: Packt Publishing, which is incorporated herein by reference.

In some embodiments, graph search process 10, in addition to the edge and contour detection discussed above, may allow line and/or shape detection to detect the plurality of geometric shapes in the image. In some embodiments, graph search process 10 may utilize the Hough Transform for detecting circles and lines. In some embodiments involving line detection, graph search process 10 may extract line segments using the thinning algorithm of Zhang-Suen. For quadrangle detection, edges may be detected or extracted from the image using a morphologic gradient. The edges may be approximated with line segments. Because a quadrangle, such as a square or rectangle, includes parallel lines, graph search process 10 may compare the angle between two segments. These shapes with parallel segments or edges may be identified as quadrangles. Additional details regarding suitable example techniques for detecting lines, circles, and quadrangles, are described in Ems, G., & Loménie, N. (2005). Automatic Learning of Structural Models of Cartographic Objects. *Graph-Based Representations in Pattern Recognition Lecture Notes in Computer Science,* 273-280, which is incorporated herein by reference. While the Hough Transform and Zhang-Suen thinning algorithm have been discussed in the above examples of detecting lines and circles in an image, other CV algorithms may be used to detect the plurality of geometric shapes within the scope of the present disclosure.

In some embodiments, analyzing the image may include identifying 320 one or more closed shapes and identifying 322 one or more connector shapes from the plurality of geometric shapes. As discussed above, the plurality of geometric shapes may include one or more closed shapes such as, but not limited to, circles, quadrangles, triangles, squares, rectangles, polygons, etc. A closed shape as used herein may include any bounded polygon or space enclosed by lines and/or unbroken contours. The plurality of geometric shapes may also include one or more connector shapes such as, but not limited to, lines, arrows, arcs, curves, etc. In some embodiments, graph search process 10 may detect each of the plurality of geometric shapes in the image and store the coordinates associated with each geometric shape. For example, if graph search process 10 detects a rectangle, graph search process 10 may store one or more coordinates specific to a rectangle such as a pair of vertices or corners (e.g., x1, y1, x2, y2). Additionally and/or alternatively, graph search process 10 may store coordinates for each vertex or corner (e.g., x1, y1, x2, y2, x3, y3, x4, y4). In another example, graph search process 10 may detect a circle and may store one or more coordinates specific to a circle such a radius and an origin (e.g., r, x1, y1). In yet another example, graph search process 10 may detect a line and may store one or more coordinates specific to a line such as the endpoints (e.g., x1, y1, x2, y2). In some embodiments, graph search process 10 may store the type of detected shape with the coordinates for each geometric shape. While the examples of a rectangle, circle, and line have been described, any closed shape or connector shape may be detected and the coordinates of that shape may be stored. While a two-dimensional Cartesian coordinate system (e.g., x-axis and y-axis) has been described for storing the coordinates of each detected shape, any coordinate system is within the scope of the present disclosure.

Figure 4:
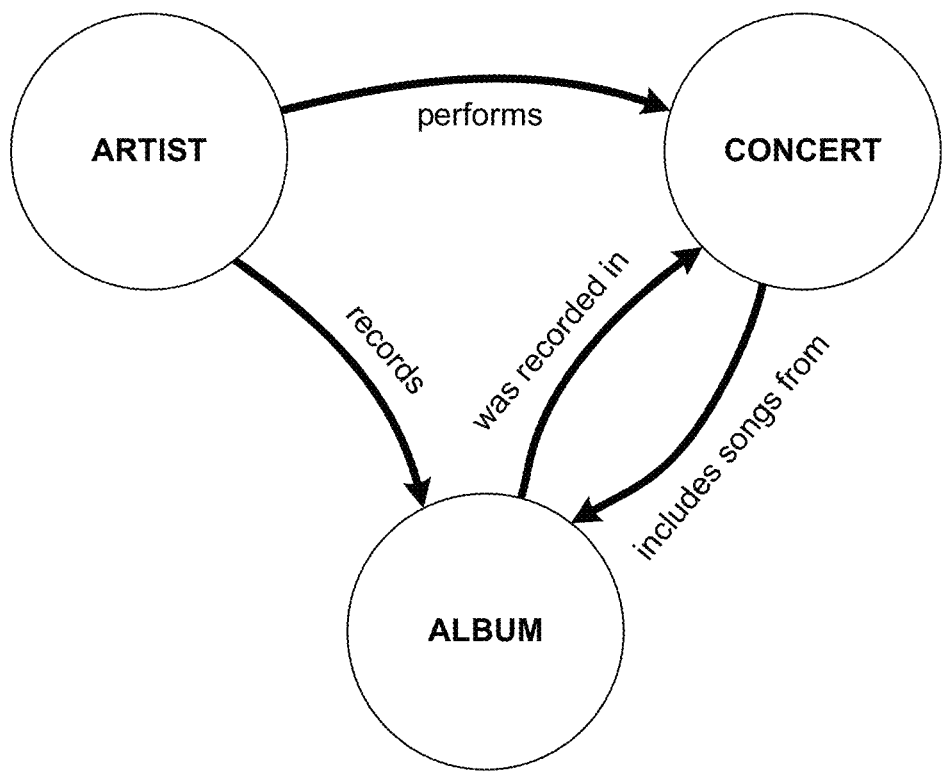
FIG. 4 is an example diagrammatic view of an image to be analyzed according to one or more example implementations of the disclosure.

Referring to the example of FIG. 4, graph search process 10 may receive an image 400. In this example, image 400 may include a graph describing three entities "Artist", "Concert", and "Album" and the relationships between each entity. As will be discussed in greater detail below, a user may seek to find an image describing the relationship between "an artist", "a concert", and/or "an album". However, because search engine technology is not understood to provide graphical data structures from an image, performing a search for image 400 showing relationships between these specific entities may be difficult. As will be discussed in greater detail below, graph search process 10 may build a graph data structure from any image without utilizing or requiring predefined rules associated with a specific image or a pre-defined understanding of the underlying content of the image.

Figure 5:
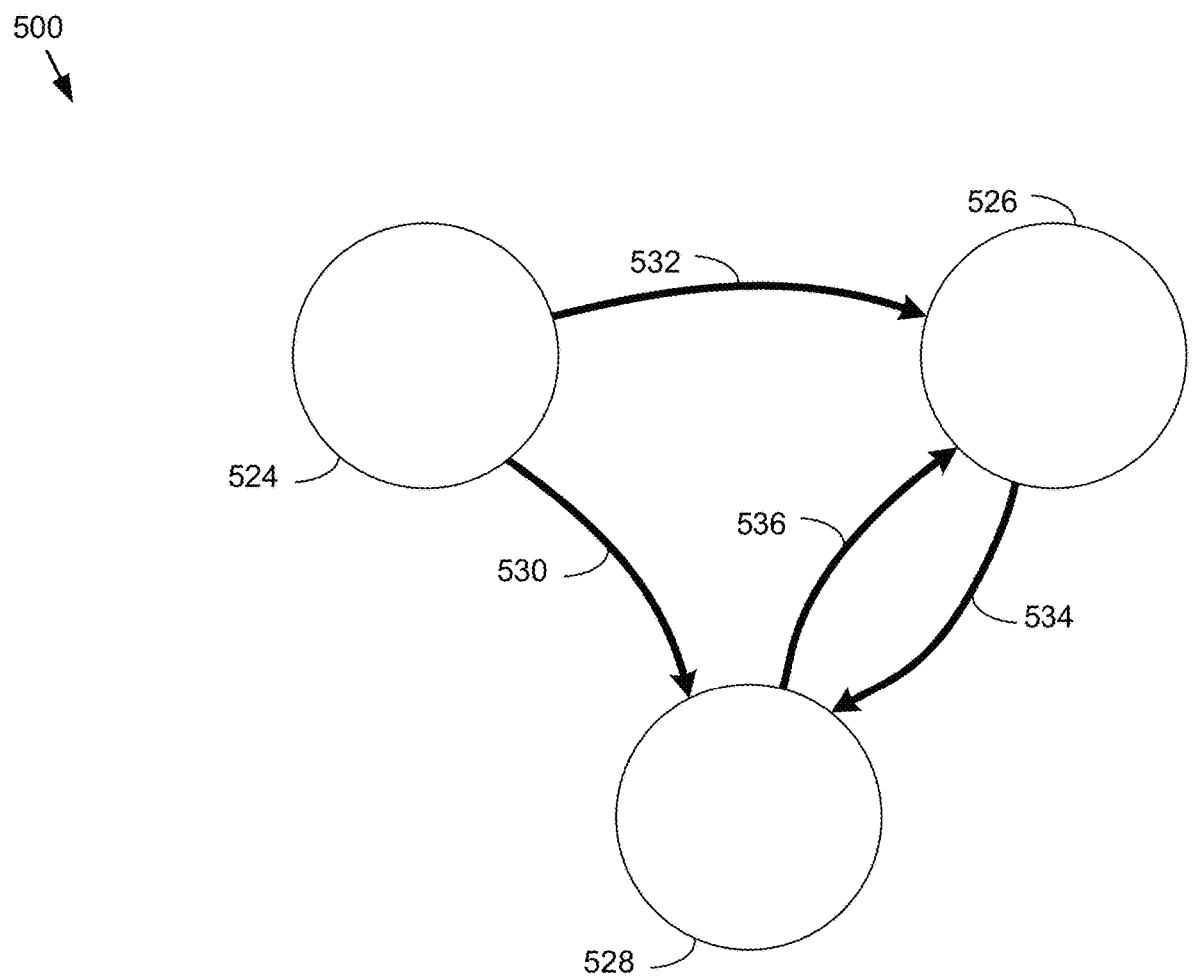
FIG. 5 is an example diagrammatic view of an image to be analyzed according to one or more example implementations of the disclosure.

Referring also to FIG. 5, and as discussed above, graph search process 10 may analyze 316 image 400 to detect a plurality of geometric shapes 524, 526, 528, 530, 532, 534, 536 in image 400. As described above, graph search process may execute one or more edge detection algorithms, shape detection algorithms, or combinations thereof to detect the plurality of geometric shapes 524, 526, 528, 530, 532, 534, 536. In the example of FIG. 4, graph search process may analyze image 400 to detect one or more closed shapes including geometric shape 524 (e.g., circle 524). As discussed above, graph search process 10 may utilize various image processing algorithms to detect geometric shape 524 and determine that geometric shape 524 is a circle. Graph search process 10 may store the coordinates and radius of geometric shape 524 in memory (cloud-based storage and/or local storage). Graph search process 10 may repeat the above analyzing to detect geometric shapes 526, 528. Similarly, graph search process 10 may determine that shapes 526, 528 are circles. As such, the coordinates for geometric shapes 526, 528 may be stored.

Graph search process 10 may analyze 316 image 400 for one or more connector shapes. As discussed above, graph search process 10 may utilize various image processing algorithms to detect geometric shape 530 and determine that geometric shape 530 is an arrow. Graph search process 10 may store the coordinates of geometric shape 530 in memory (cloud-based storage and/or local storage). Graph search process 10 may repeat the above analyzing to detect connector shapes 532, 534, 536. Similarly, graph search process 10 may determine that shapes 532, 534, 536 are arrows. As such, the coordinates for geometric shapes 532, 534, 536 may be stored. Additionally and/or alternatively, graph search process 10 may detect one or more features of the plurality of geometric shapes. For example, graph search process 10 may detect geometric shape 530 and determine that geometric shape 530 is an arrow "pointing to" closed shape 528. As will be discussed in greater detail below, graph search process 10 may store information regarding these features when storing coordinates for the geometric shape.

Figure 6:
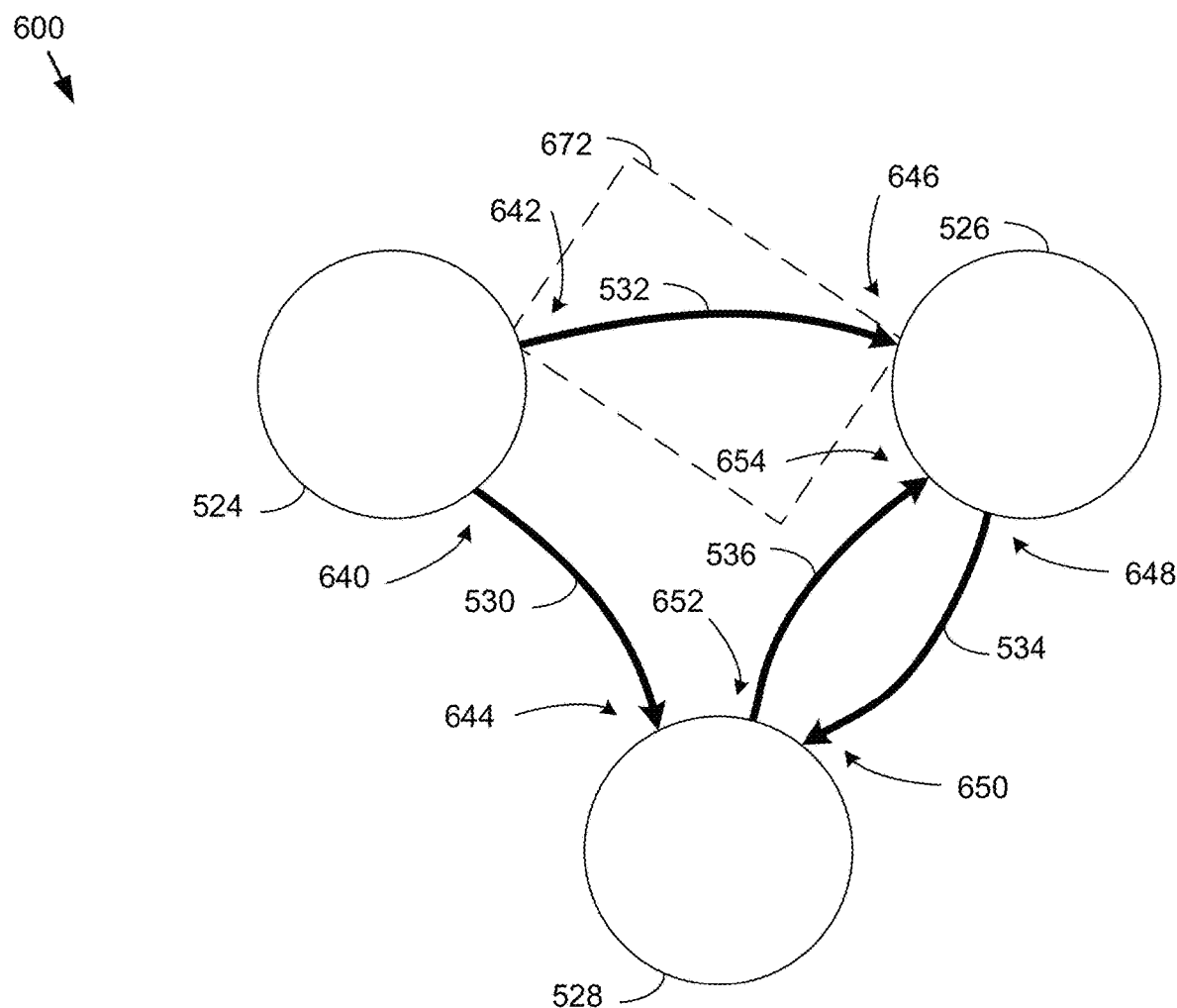
FIG. 6 is an example diagrammatic view of an image to be analyzed according to one or more example implementations of the disclosure.
Figure 7:
FIG. 7 is an example diagrammatic view of an image to be analyzed according to one or more example implementations of the disclosure.

Referring also to FIG. 6, graph search process 10 may identify 338 one or more intersections between the one or more closed shapes and the one or more connector shapes. In some embodiments, graph search process 10 may calculate the one or more intersections between the one or more connector shapes and the one or more closed shapes to find connector shapes that start from the perimeter or edge of one closed shape and end at the perimeter or edge of another closed shape. In the example of FIG. 6, graph search process 10 may identify an intersection 640 between closed shape 524 and connector shape 530 based upon, at least in part, the coordinates of each geometric shape. For example, using the coordinates of closed shape 524, connector shape 530 and connector shape 532, graph search process 10 may identify two points of intersection 640, 642. Graph search process 10 may identify intersections between each of the one or more closed shapes and the one or more connector shapes. For example, graph search process 10 may identify an intersection 644 between connector shape 530 and closed shape 528, an intersection 646 between connector shape 532 and closed shape 526, an intersection 648 between closed shape 526 and connector shape 534, an intersection 650 between connector shape 534 and closed shape 528, an intersection 652 between closed shape 528 and connector shape 536, and/or an intersection 654 between connector shape 536 and closed shape 526.

In some embodiments, one or more closed shapes and/or one or more connector shapes may not intersect with one another. For example, graph search process 10 may receive an image with three circles. While graph search process 10 may detect these three circles, graph search process 10 may be unable to detect one or more connector shapes and one or more intersections between the three closed shapes and any connector shapes. As will be discussed in greater detail below, graph search process 10 may determine that the image does not include a graph (e.g., pictorial representation of a set of nodes where some pairs of nodes are connected by links) and may inform the user that a graph data structure cannot be built from the image. Additionally and/or alternatively, graph search process 10 may simply ignore the image without attempting to build a graph data structure.

In some embodiments, graph search process 10 may also build 318 a graph data structure resembling the image based upon, at least in part, analyzing the image. As discussed above, graph search process 10 may receive an image, analyze the image to detect a plurality of geometric shapes, and build a graph data structure resembling the image. A graph data structure as used herein, may include but is not limited to a set of vertices or nodes linked together by edges or lines. In some embodiments, each edge or line of a graph data structure may describe a relationship between the linked vertices. As will be discussed in greater detail below, a graph data structure may include graph data structure clauses describing one or more vertices and the edge linking together those vertices.

In some embodiments of graph search process 10, building the graph data structure may include defining 356 each of the one or more closed shapes intersecting with the one or more connector shapes as an entity within the one or more graph data structure clauses. An entity as used herein may include, but is not limited to, a node or vertex of a graph structure. In some embodiments, an entity may be the subject of one or more relationships with other entities. For example and referring again to FIG. 4, image 400 may include a graph with three entities, "Artist", "Concert", and "Album". As will be discussed below, the relationships between these entities include "performs", "records", "was recorded in", and "includes songs from". In some embodiments, graph search process 10 may define each closed shape as an entity within a graph data structure clause. Returning to the example of FIG. 6, graph search process 10 may define the closed shapes 524, 526, 528 as entities. In some embodiments, graph search process 10 may define each of closed shapes 524, 526, 528 as entities within a graph data structure. For example, a clause of a graph data structure may generated in the format of "(entity label)-[relationship]-(entity label)." While the above described format uses the term "entity", the terms "vertex" and "node" may be used interchangeably within the scope of the present disclosure. Example graph data structure formats include GraphML, GraphSON, etc.

Graph search process 10 may define 358 each of the one or more connector shapes intersecting with the one or more closed shapes as a relationship within the one or more graph data structure clauses. Returning to the example of FIG. 6, graph search process 10 may define the connector shapes 530, 532, 534, 536 as relationships (e.g., edges) between two or more entities (e.g., vertices). In some embodiments, graph search process 10 may define each of connectors shapes 530, 532, 534, 536 as relationships within a graph data structure. As described above and in some embodiments, graph search process 10 may identify features in the one or more geometric shapes. For example, connector shapes 530, 532, 534, and 536 include arrows. These arrows and where the arrows are "pointed to" may be used by graph search process 10 to define the relationship between two entities. For example, graph search process 10 may determine that an artist records an album based upon, at least in part, the direction and position of the arrow (e.g., connector shape 530). While an arrow has been described, other connector shapes with other features (e.g., dashed lines, thicker lines, thinner lines, etc.) may be analyzed by graph search process 10 for building the graph data structure and/or defining relationships between entities in the graph data structure.

In some embodiments, building the graph data structure may also perform 360 optical character recognition (OCR) on an area within each of the one or more closed shapes to identify text to add as a label for each entity. OCR as used herein may include but is not limited to electronic conversion of images of typed, handwritten, or printed text into a machine-readable or machine-encoded text. In some embodiments, graphs may include closed shapes to represent an entity and a label or description of the entity may be identified within the entity/closed shape. Using the edge detection capabilities discussed above, graph search process 10 may perform OCR on the area defined within each closed shape to identify text. Referring again to the example of FIG. 4, graph search process 10 may perform OCR on closed shape 524 to identify the text "Artist". In some embodiments, graph search process 10 may add the text as a label for the associated entity. For example, graph search process 10 may add the text "Artist" as a label for the entity of closed shape 524.

In some embodiments, performing OCR to identify text within an enclosed shape may include identifying multiple labels associated with the entity. Referring also to the example of FIG. 7, graph search process 10 may define four entities as four closed shapes 762, 764, 766, 768. In some embodiments, graph search process 10 may perform OCR on the text within each closed shape 762, 764, 766, 768. During OCR, graph search process 10 may identify four labels based upon typographical emphasis and/or one or more typographical characteristics. For example, graph search process 10 may identify a "MANAGER" label as being in 10 pt. font and in bold lettering; a "NAME:" label as being in 8 pt. font and positioned below the "MANAGER" label; an "AGE" label as being in 8 pt. font and positioned below the "NAME" label; and/or a "SALARY" label as being in 8 pt. font and positioned below the "AGE" label. While four labels have been discussed with a bold typographical emphasis, any number of labels with any number of typographical characteristics may be used within the scope of the present disclosure. Because of these typographical characteristics and/or the position of the text within the closed shape, graph search process 10 may add one or more labels to the associated entity.

Graph search process 10 may perform 370 OCR on an area surrounding each of the one or more connector shapes to identify text to add as a label for each relationship. In some embodiments, graphs may include connector shapes to represent an relationship between at least two entities and a label or description of the relationship may be identified near the connector shape. For example and referring again to FIG. 4, labels for the relationships in image 400 between the entities may be found near each connector shape, (e.g., "performs" near connector shape 530, "records" near connector shape 532, "includes songs from" near connector shape 534, and "was recorded in" near connector shape 536). In some embodiments, graph search process 10 may perform OCR within a pre-defined distance from each connector shape. These pre-defined distances may be provided by a user input, as an input from CV application 64, as an input from search application 20, from a pre-defined distance stored in memory, etc. In some embodiments, graph search process 10 may calculate a rectangular area around the connector shape and perform OCR within the rectangular area. In one example and referring again to FIG. 6, graph search process 10 may define a rectangular area 672 using the endpoints of a connector shape as opposite vertices of the rectangular area 672. While a rectangular area has been described, an any shape (e.g., circular, triangular, etc.) may be used to define an area surrounding a connector shape within the scope of the present disclosure.

In some embodiments, graph search process 10 may not identify any text in the area defined within a closed shape and/or in an area surrounding a connector shape. In this example, graph search process 10 may determine that one or more of the closed shapes and/or one or more of the connector shapes are not related to a graph. As such, graph search process 10 may omit the one or more closed shapes and/or connector shapes from the graph data structure.

Figure 8:
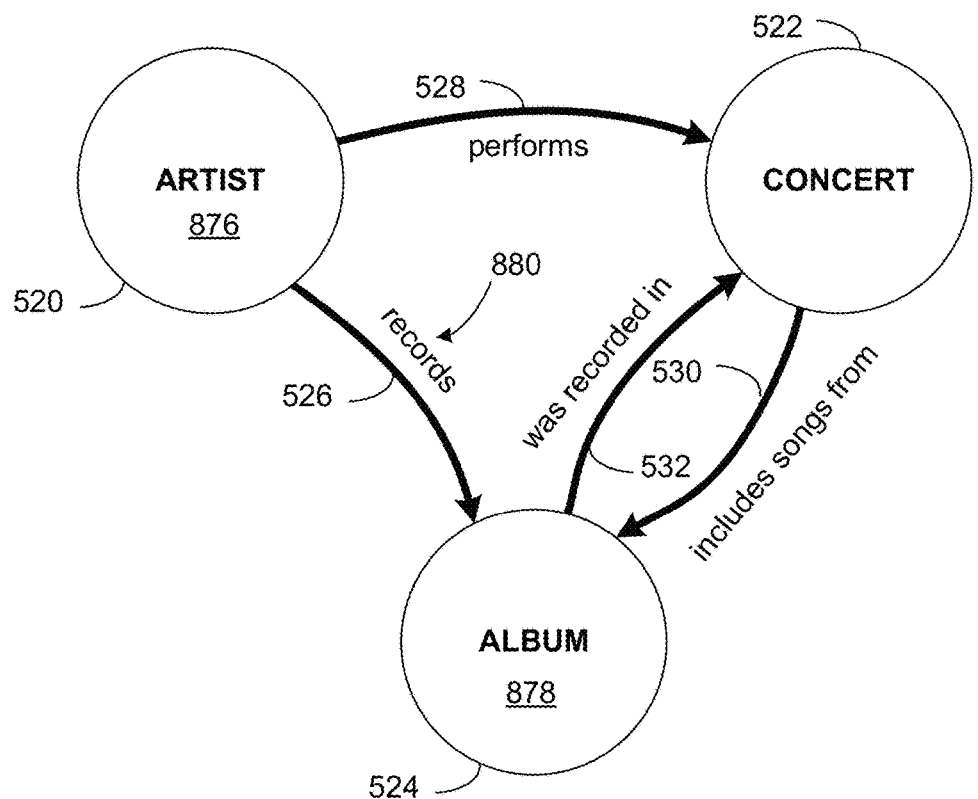
FIG. 8 is an example diagrammatic view of a graph data structure according to one or more example implementations of the disclosure.

In some embodiments, building the graph data structure may include traversing 374 the image to generate one or more graph data structure clauses. As discussed above, a clause of a graph data structure may be generated using entities and relationships of a graph. Referring also to the example of FIG. 8, graph search process 10 may build the graph data structure 800 with one or more graph data structure clauses. In some embodiments, graph search process 10 may generate the one or more graph data structure clauses by traversing the image. In one example, traversing the image may start with closed shape 524. As discussed above, an entity 876 may be defined for closed shape 524. Graph search process 10 may determine that one end of connector shape 530 intersects with closed shape 524. Graph search process 10 may also determine that the other end of connector shape 530 intersects with closed shape 528. Graph search process may define closed shape 528 as an entity 878 and connector shape 530 as a relationship 880 between entity 524 and entity 528. Graph search process 10 may perform OCR on the areas within closed shapes 524 and 528 to identify text (e.g., "Artist" and "Album") to add as a label for each entity. Graph search process 10 may perform OCR on an area surrounding connector shape 530 to identify text (e.g., "records") to add as a label to the relationship. Graph search process 10 may generate a graph data structure clause for this set of entities and the relationship between them. For example, graph search process 10 may generate a graph data structure clause in the format of: "(Artist)-[records]-(Album)." Graph search process 10 may continue generating the one or more graph data structures until each entity and relationship has been included in a graph data structure. In the example of FIG. 8, graph search process may generate the following graph data structure clauses for image 400: "(Artist)-[records]-(Album)"; "(Artist)-[performs]-(Concert)"; "(Album)-[was recorded in]-(Concert)"; and "(Concert)-[includes songs from]-(Album)".

In some embodiments, graph search process 10 may store the graph data structure and/or the generated graph data structure clauses in a graph database. As will be discussed in greater detail below, the graph data structure may be stored in a graph database and/or any other data store that is "graph aware" and allows for the use of a graph query language (e.g., Gremlin, Cypher, SparkQL, etc.).

In some embodiments, traversing 374 the image to generate the one or more graph data structure clauses may include traversing beginning from one or more of a user-selected entity and an entity selected based upon, at least in part, one or more criteria. In some embodiments, a user generating the graph data structure for an image may select an entity to begin traversing from to generate the one or more graph data structure clauses. For example, a user may select entity 876 and/or closed shape 524 to begin traversing the image from. In some embodiments, graph search process 10 may select an entity based upon at least in part, one or more criteria such as an entity and/or closed shape with the most edges or relationships.

Graph search process 10 may receive 382 a user query and divide 384 the user query into at least one smaller query at each conjunction within the user query. A user query can be received at any user input device such as a keyboard, a pointing/selecting device, a touch-screen interface, a voice-command prompt, etc. In one example, the user query may include "search for a graph that has artists performing concerts in venues and artists recording albums." In some embodiments, graph search process 10 may identify search-related words or phrases to remove from the user query. For example, phrases like "search for a graph that has . . . " or "search for . . . that has . . . " may be a search-related phrase used to initiate the search and may be omitted from the actual query searched by graph search process 10 and/or passed to search application 20. Graph search process 10 may also use phrases such as, but not limited to, "graph" or "image" to direct search application 20 and/or graph search process 10 to search for graph data structures.

In some embodiments, graph search process 10 may divide the user query into at least one smaller query at each conjunction (e.g., on the border of "or", "and", etc.) within the user query. In the above example user query, graph search process 10 may divide the user query at the conjunction "and" to form at least one smaller query, (e.g., "artists performing concerts in venues" and "artists recording albums").

Graph search process 10 may transform 386 the at least one smaller query into at least one graph data structure query. As discussed above, a graph data structure query may be a formatted query to search a graph database or other "graph aware" store to identify matching graph data structures. In some embodiments, transforming the at least one smaller query into at least one graph data structure query may include transforming each noun of each at least one smaller query into an entity and/or each verb of each at least one smaller query into a relationship. For example, the two smaller user queries "artists performing concerts in venues" and "artists recording albums" may be transformed into at least one graph data structure query by transforming each noun into an entity and/or each verb into a relationship. In this example, "artists performing concerts in venues" may be transformed into "vertex (label artist) with edge (label performs in) to vertex (label venue)". Additionally and/or alternatively, "artists performing concerts in venues" may be transformed into "entity (label artist) with relationship (label performs in) to entity (label venue)". The smaller query "artists recording albums" may be transformed into "vertex (label artist) with edge (label records) to vertex (label album)". Additionally and/or alternatively, "artists recording albums" may be transformed into "entity (label artist) with relationship (label records) to entity (label album)". As such, graph search process 10 may transform the user query "search for a graph that has artists performing concerts in venues and artists recording albums" into the graph data structure queries "vertex (label artist) with edge (label performs in) to vertex (label venue)" and "vertex (label artist) with edge (label records) to vertex (label album)".

Graph search process 10 may conduct 388 a search against one or more graph data structures based upon, at least in part, the at least one smaller query. As discussed above, graph search process 10 may conduct the search against one or more graph data structures stored in a graph database or other "graph aware" data store using a graph query language (e.g., Gremlin, Cypher, SparkQL, etc.). In some embodiments, graph search process 10 may return 390 at least one image associated with the graph data structure that satisfies at least a portion of the at least one smaller query.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method comprising:
analyzing, on at least one processor, an image to detect a plurality of geometric shapes in the image, wherein analyzing the image incudes:

identifying one or more closed shapes and one or more connector shapes from the plurality of geometric shapes; and identifying one or more intersections between the one or more closed shapes and the one or more connector shapes;

building a graph data structure representative of the image based upon, at least in part, analyzing the image, wherein building the graph data structure includes traversing the image to generate one or more graph data structure clauses, and wherein building the graph data structure includes:

defining each of the one or more closed shapes intersecting with the one or more connector shapes as an entity within the one or more graph data structure clauses;

defining each of the one or more connector shapes intersecting with the one or more closed shapes as a relationship within the one or more graph data structure clauses;

performing optical character recognition (OCR) on an area within a closed shape for each of the one or more closed shapes to identify text that is present within the closed shape, to add as a label for each entity, omitting the closed shape from the graph data structure if the closed shape is not related to a graph, wherein the graph is stored with coordinates in storage; and performing OCR within a rectangular area whose opposite vertices are endpoints of a connector shape for each of the one or more connector shapes to identify text that is present within the rectangular area, to add as a label for each relationship, and omitting the connector shape from the graph data structure, wherein the closed shape or the connector shape is omitted from the graph data structure if the connected shape is not related to the graph;

receiving a user query;

dividing the user query into at least one smaller query at each conjunction within the user query;

transforming the at least one smaller query into at least one graph data structure query including transforming each noun of each at least one smaller query into an entity and each verb of each at least one smaller query into a relationship, wherein the at least one graph data structure query is a formatted query to search a graph database to identify matching graph data structures;

conducting a search against one or more graph data structures based upon, at least in part, the at least one smaller query by conducting a search against one or more graph data structures stored in the graph database; and returning at least one image associated with the graph data structure that satisfies at least a portion of the at least one smaller query.

2. The computer-implemented method of claim 1, wherein traversing the image to generate the one or more graph data structure clauses includes traversing beginning from one or more of a user-selected entity and an entity selected based upon, at least in part, one or more criteria.

3. A computer program product comprising a non-transitory computer readable storage medium having a plurality of instructions stored thereon, which, when executed by a processor, cause the processor to perform operations including:

analyzing an image to detect a plurality of geometric shapes in the image, wherein analyzing the image incudes:

identifying one or more closed shapes and one or more connector shapes from the plurality of geometric shapes; and identifying one or more intersections between the one or more closed shapes and the one or more connector shapes;

building a graph data structure representative of the image based upon, at least in part, analyzing the image, wherein building the graph data structure includes traversing the image to generate one or more graph data structure clauses, and wherein building the graph data structure includes:

defining each of the one or more closed shapes intersecting with the one or more connector shapes as an entity within the one or more graph data structure clauses;

defining each of the one or more connector shapes intersecting with the one or more closed shapes as a relationship within the one or more graph data structure clauses;

performing optical character recognition (OCR) on an area within a closed shape for each of the one or more closed shapes to identify text that is present within the closed shape, to add as a label for each entity, omitting the closed shape from the graph data structure if the closed shape is not related to a graph, wherein the graph is stored with coordinates in storage; and performing OCR within a rectangular area whose opposite vertices are endpoints of a connector shape for each of the one or more connector shapes to identify text that is present within the rectangular area, to add as a label for each relationship, and omitting the connector shape from the graph data structure, wherein the closed shape or the connector shape is omitted from the graph data structure if the connected shape is not related to the graph;

receiving a user query;

dividing the user query into at least one smaller query at each conjunction within the user query;

transforming the at least one smaller query into at least one graph data structure query including transforming each noun of each at least one smaller query into an entity and each verb of each at least one smaller query into a relationship, wherein the at least one graph data structure query is a formatted query to search a graph database to identify matching graph data structures;

conducting a search against one or more graph data structures based upon, at least in part, the at least one smaller query by conducting a search against one or more graph data structures stored in the graph database; and returning at least one image associated with the graph data structure that satisfies at least a portion of the at least one smaller query.

4. The computer program product of claim 3, wherein traversing the image to generate the one or more graph data structure clauses includes traversing beginning from one or more of a user-selected entity and an entity selected based upon, at least in part, one or more criteria.

5. A computing system comprising:

a processor and a memory module coupled with the processor, the processor being configured for:

analyzing an image to detect a plurality of geometric shapes in the image, wherein analyzing the image incudes:
  identifying one or more closed shapes and one or more connector shapes from the plurality of geometric shapes; and
  identifying one or more intersections between the one or more closed shapes and the one or more connector shapes;
building a graph data structure representative of the image based upon, at least in part, analyzing the image, wherein building the graph data structure includes traversing the image to generate one or more graph data structure clauses, and wherein building the graph data structure includes:
  defining each of the one or more closed shapes intersecting with the one or more connector shapes as an entity within the one or more graph data structure clauses;
  defining each of the one or more connector shapes intersecting with the one or more closed shapes as a relationship within the one or more graph data structure clauses;
  performing optical character recognition (OCR) on an area within a closed shape for each of the one or more closed shapes to identify text that is present within the closed shape, to add as a label for each entity, and omitting the closed shape from the graph data structure if the closed shape is not related to a graph, wherein the graph is stored with coordinates in storage; and
  performing OCR within a rectangular area whose opposite vertices are endpoints of a connector shape for each of the one or more connector shapes to identify text that is present within the rectangular area, to add as a label for each relationship, and omitting the connector shape from the graph data structure, wherein the closed shape or the connector shape is omitted from the graph data structure if the connected shape is not related to the graph;
receiving a user query;
dividing the user query into at least one smaller query at each conjunction within the user query;
transforming the at least one smaller query into at least one graph data structure query including transforming each noun of each at least one smaller query into an entity and each verb of each at least one smaller query into a relationship, wherein the at least one graph data structure query is a formatted query to search a graph database to identify matching graph data structures;
conducting a search against one or more graph data structures based upon, at least in part, the at least one smaller query by conducting a search against one or more graph data structures stored in the graph database; and
returning at least one image associated with the graph data structure that satisfies at least a portion of the at least one smaller query.

6. The computer-implemented method of claim 1, wherein the relationship defines an affiliation between each of the one or more connector shapes intersecting with the one or more closed shapes with the one or more graph data structure clauses, wherein a first graph data structure clause for a first entity connected by a first connector shape pointing to a second entity is comprised of a first label for the first entity, followed by a second label for the first connector shape, and then followed by a third label for the second entity, and wherein the second label expresses a first relationship between the first entity represented by the first label and the second entity represented by the third label.

7. The computer program product of claim 3, wherein the relationship defines an affiliation between each of the one or more connector shapes intersecting with the one or more closed shapes with the one or more graph data structure clauses, wherein a first graph data structure clause for a first entity connected by a first connector shape pointing to a second entity is comprised of a first label for the first entity, followed by a second label for the first connector shape, and then followed by a third label for the second entity, and wherein the second label expresses a first relationship between the first entity represented by the first label and the second entity represented by the third label.

8. The computing system of claim 5, wherein the relationship defines an affiliation between each of the one or more connector shapes intersecting with the one or more closed shapes with the one or more graph data structure clauses, wherein a first graph data structure clause for a first entity connected by a first connector shape pointing to a second entity is comprised of a first label for the first entity, followed by a second label for the first connector shape, and then followed by a third label for the second entity, and wherein the second label expresses a first relationship between the first entity represented by the first label and the second entity represented by the third label.

9. The computing system of claim 5, wherein traversing the image to generate the one or more graph data structure clauses includes traversing beginning from one or more of a user-selected entity and an entity selected based upon, at least in part, one or more criteria.

* * * * *